United States Patent [19]

Levy

[11] Patent Number: 4,524,520
[45] Date of Patent: Jun. 25, 1985

[54] CARRIAGE POSITIONING SYSTEM

[76] Inventor: Nessim I. Levy, 13 Habrosh St., Savyon, Israel

[21] Appl. No.: 469,158

[22] Filed: Feb. 24, 1983

[51] Int. Cl.³ .................... G01D 15/16; F16H 55/52
[52] U.S. Cl. ................................ 33/1 M; 74/89.22; 346/139 B
[58] Field of Search .............. 33/1 M; 74/89.2, 89.21, 74/89.22; 346/139 B

[56] References Cited

U.S. PATENT DOCUMENTS

| | | | |
|---|---|---|---|
| 2,685,377 | 8/1954 | Auger | 74/89.22 |
| 3,068,575 | 12/1962 | Fenske et al. | 33/1 M |
| 3,155,383 | 11/1964 | Whitmore | 33/1 M |
| 3,258,776 | 6/1966 | Boyle et al. | 33/1 M |
| 3,850,043 | 11/1974 | Tarbox | 33/1 M |
| 4,327,596 | 5/1982 | Simon | 33/1 M |
| 4,420,886 | 12/1983 | Amano | 33/1 M |

FOREIGN PATENT DOCUMENTS 46154  4/1981  Japan ................ 74/89.22

Primary Examiner—Richard R. Stearns
Attorney, Agent, or Firm—Benjamin J. Barish

[57] ABSTRACT

A system for positioning an X-axis carriage and a Y-axis carriage comprises two flexible coupling elements for the X-axis carriage, and a single flexible coupling element for the Y-axis carriage. Providing two such coupling elements for the X-axis carriage enables shorter-length elements to be used, thereby providing higher dimensional stability under load or temperature variations, and also higher-load capabilities than when a single flexible coupling element is used for the respective carriage. Further, several preferred embodiments are described wherein each of the flexible coupling elements occupies a single plane, thereby enabling belts, rather than cables, to be used, further enhancing the dimensional stability and strength of the system. Still further, in all the described arrangements, the transmission ratio of the two X-axis coupling elements and of the single Y-axis coupling element are all the same, thereby obviating the need for different transmission elements to equalize the transmission ratios.

11 Claims, 4 Drawing Figures

CARRIAGE POSITIONING SYSTEM

BACKGROUND OF THE INVENTION

The present invention relates to a carriage positioning system. The invention is particularly useful in a system for positioning a carriage along either the X- or Y-axis, and is therefore described below particularly with respect to such a system.

Two-axis carriage positioning systems are widely used in a number of applications where orthogonal positioning is required, for example in data plotters for plotting curves or preparing drawings. As a rule, the carriages are driven to their specified positions by X-axis and Y-axis drive motors. Other systems are known wherein the carriages are manually driven but are coupled to shaft encoders to read-out their positions. The coupling between the respective motors or encoders and carriages is usually effected by flexible coupling elements, such as cables, belts or chains. Usually a single cable, belt or chain is trained over a plurality of pulleys for driving the X-axis carriage; and a separate cable, belt or chain is trained over another group of pulleys for driving the Y-axis carriage.

In the known systems using a single flexible coupling element (e.g., cable, belt or chain) for the X-axis carriage, the coupling element must necessarily be very long, and therefore dimensional changes in the element due to strain or temperature-variations greatly affect the precision of the system in positioning the respective carriage. In addition, the use of a single such flexible coupling element for the X-axis places a great load on the couling element which tends to increase dimensional changes due to strain, and also limits the load capability of the positioning system. Further, many of the known systems require the flexible coupling elements to change planes, and therefore, are either restricted to the use of cables, or include complicated constructions to accommodate the change in planes. Still further, the pulley arrangement in many of the known systems produce a transmission ratio or the X-axis coupling element which is not identical to that of the Y-axis coupling element, and therefore require different gearing or the like in order to accommodate or equate the different transmission ratios.

BRIEF SUMMARY OF THE PRESENT INVENTION

An object of the present invention is to provide a carriage positioning system having advantages in one or all of the above respects.

According to a broad aspect of the present invention, there is provided a carriage positioning system including two flexible coupling elements each coupling one end of the carriage for movement with respect to the frame. Each of the two flexible coupling elements has its opposite ends fixed to the frame on the opposite sides of the respective end of the carriage and is trained over a pulley carried by the carriage on each of the two opposite sides of the carriage, and over a further pulley carried by the frame on each of the two opposite sides of the carriage. Each of the flexible coupling elements is coupled to a member (e.g. motor) for driving the carriage or to a member (e.g. encoder) for being driven by the carriage.

In the preferred embodiments of the invention described below, the positioning system further includes a second carriage (e.g. the Y-axis carriage) carried by and movable with respect to said first-mentioned carriage (e.g., the X-axis carriage) along an axis perpendicular to the first carriage. The second carriage includes a single flexible coupling element fixed at its two ends to the frame at one side of the two carriages, which coupling element is trained over two pulleys carried by each end of the first-mentioned (e.g. X-axis) carriage, a further pulley carried by each end of the second (e.g. Y-axis) carriage between the associated last mentioned two pulleys, and a still further pulley carried by the frame at the side thereof opposite to that to which the two ends of the single flexible coupling elements are fixed. The single flexible coupling element is also coupled to a member (e.g. motor or encoder) for driving or for being driven thereby.

Several embodiments of the invention are described below, wherein the complete length of each of the flexible coupling elements occupies a single plane. In such embodiments, the flexible coupling elements may each be in the form of a belt, which is far preferable in many applications over a cable (normally required in arrangements involving a change in plane) because of the dimensional integrity and the strength of belts.

The flexible coupling elements in most applications would normally be coupled to X-axis and Y-axis motors for driving the carriages along their respective axes according to the positional data supplied to the motors. However, there are many applications wherein the carriages are manually, or otherwise, driven, and the flexible coupling elements are coupled to shaft encoders for reading-out the positions of the carriages.

Further features and advantages of the invention will be apparent from the description below.

BRIEF DESCRIPTION OF THE DRAWINGS

The invention as herein described, by way of example only, with reference to the accompanying drawings, wherein.

DESCRIPTION OF PREFERRED EMBODIMENTS

Figure 1:
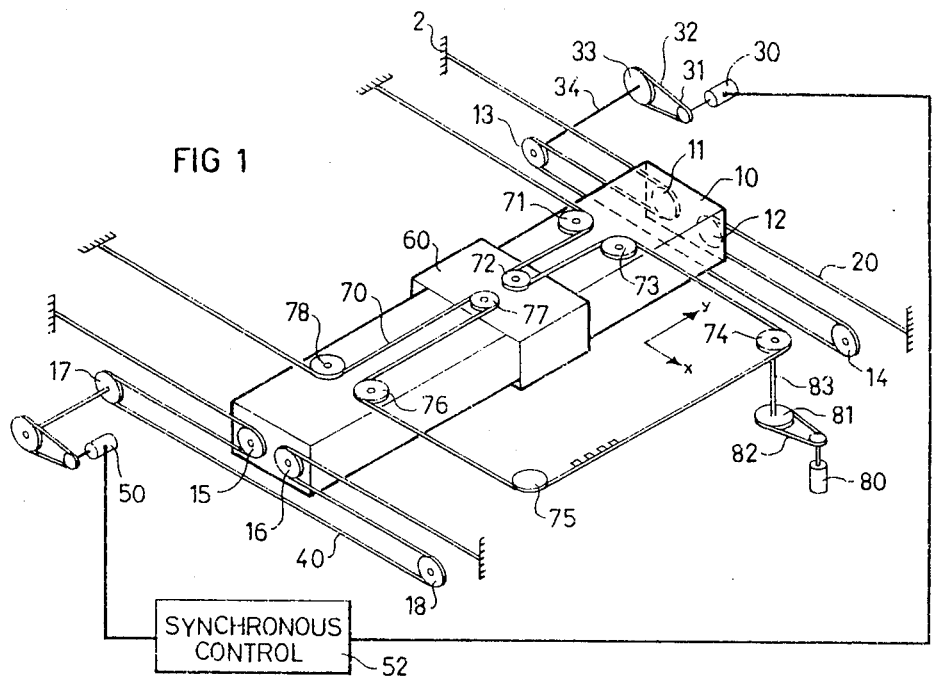
FIGS. 1–4 illustrate four 2-axes positioning systems constructed in accordance with the present invention.

With reference first to FIG. 1, there is illustrated one form of two axes positioning system, which may be a plotter or the like for moving pen, paper, or other device with respect to a frame, schematically designated 2. Thus, the system illustrated in FIG. 1 includes an X-carriage, generally designated 10, movable along the X-axis by a first flexible coupling element 20 at one end of the carriage driven by an X-axis motor 30. The X-axis carriage 10 is also driven by a second flexible coupling element 40 coupled to the opposite end of the carriage and driven by a second X-axis motor 50.

Mounted on the X-axis carriage 10 is a Y-axis carriage 60 which is driven along the Y-axis by a flexible coupling element 70 driven by a Y-axis motor 80. It will thus be seen that by controlling the two X-axis motors 30 and 50 synchronously, and the Y-axis motor 80, carriage 60 may be positioned at any desired point along the X-axis and Y-axis.

Because each of the flexible coupling elements 20, 40 and 70 in FIG. 1 occupies a single plane (i.e., none requires a change in planes) they are all shown as belts, which is an important advantage of the illustrated arrangement because of the strength and dimensional stability provided by belts, as distinguished from cables for example.

With respect to belt 20, it will be seen that its opposite ends are fixed to the frame 2, and the intermediate portion of the belt is trained over a pair of pulleys 11, 12 carried at one end of the X-axis carriage 10, and also over a pair of pulleys 13, 14 carried by the frame 2. All the pulleys 11, 12, 13 and 14, as well as the complete length of belt 20, are in a common plane, which is perpendicular to the X-Y plane of movement of the two carriages 10 and 60. Motor 30 is coupled to belt 20 in any suitable manner, the coupling being schematically illustrated in FIG. 1 as including a drive wheel 31 coupled to the motor shaft and in turn driving, via belt 32, another wheel 33 coupled by shaft 34 to pulley 13 for belt 20.

Belt 40 at the other side of the X-axis carriage 10 is driven in a similar manner by its motor 50, namely via pulleys 15 and 16 carried by that end of the carriage, and pulleys 17 and 18 carried by the frame 2. It will be noted that all of these pulleys are in the same plane, parallel to the plane of pulleys 11–14 at the opposite end of the X-carriage 10, and perpendicular to the X-Y plane of movement of the carriages.

The Y-carriage 60 is mounted for movement on the X-axis carriage 10, and is moved by a single belt 70 along the Y-axis. Thus, belt 70 is fixed at its opposite ends to frame 2 at one side of the two carriages. The intermediate portion of belt 70 is trained over a series of pulleys, including pulley 71 carried by the X-carriage 10, pulley 72 carried by the Y-axis carriage 60, pulley 73 carried by the Y-axis carriage 10, pulleys 74 and 75 carried by the fixed frame 2, and finally pulleys 76, 77 and 78 corresponding to pulleys 71, 72 and 73 at the opposite end of the Y-axis carriage 60.

The two X-axes motors 30 and 50 would have to be synchronously operated. For this purpose, FIG. 1 illustrates a control, schematically indicated by block 52, for operating the two motors 30 and 50 in synchronism.

The Y-axis motor 80 for driving the Y-axis belt 70 may be coupled to the latter cable in any suitable manner. This coupling is schematically illustrated in FIG. 1 as including a wheel 81 driven by the Y-axis motor 80 via a belt 82, which wheel 81 is coupled via shaft 83 to pulley 74 on which is trained the Y-axis cable 70.

The provision of two belts (or other flexible coupling elements) 20 and 40, respectively, for driving the X-axis carriage 10 provides a number of important advantages. First, it substantially shortens the length of the X-axis belts, which would otherwise be required if a single common belt were used, and therefore enables a high degree of dimensional stability to be maintained even under high load or temperature variations. Further, by dividing the load for moving the X-axis carriage 10 between two belts, each driven by a separate motor, the load-capability of the system is substantially increased. Further, since the two X-axis belts 20 and 40, and their respective pulleys, are each in common planes (perpendicular to the X-Y plane) this arrangement permits the use of belts, rather than cables, thereby further increasing the dimensional stability and the load capability of the system. Finally, the transmission ratio of the two X-axis belts 20 and 40, and of the Y-axis belt 70, are all the same, thereby obviating the need for different transmission elements to equalize the transmission ratios.

Figure 2:
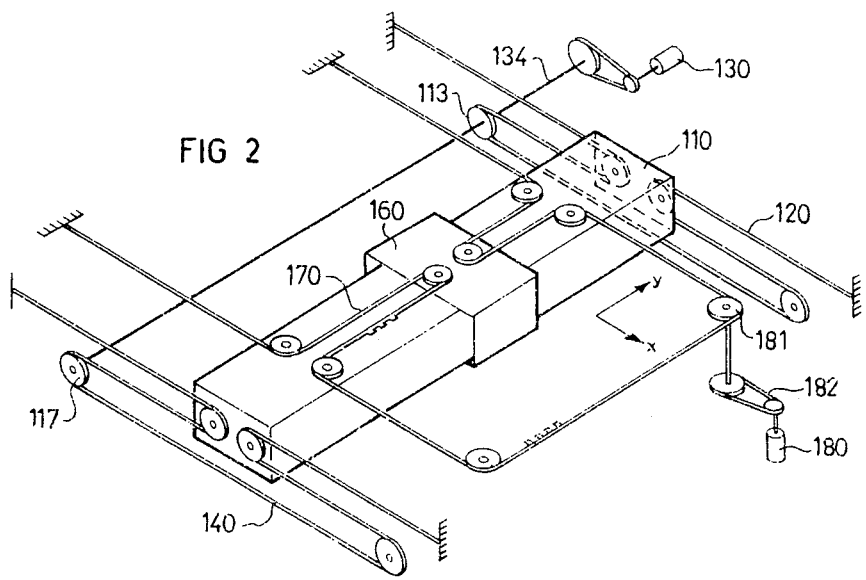

FIG. 2 illustrates an arrangement similar to that of FIG. 1, except that instead of providing two separate motors 30, 50 synchronously driven by control unit 52, for driving the two X-axes belts 20 and 40, a single X-axis motor is used. Such a motor is shown at 130 in FIG. 2, wherein it will be seen that it drives a shaft 134, coupling the two pulleys 113 and 117, of the two X-axis drive belts 120 and 140, corresponding to elements 13, 17, 20 and 40 in FIG. 1. The X-axis drive belts 120 and 140 are otherwise the same as in FIG. 1 for driving the X-axis carriage 110.

The Y-axis carriage 160 in FIG. 2 is driven in the same manner as in FIG. 1 by a single Y-axis flexible coupling belt 170 driven by a Y-axis motor 180 via a wheel 181 and another belt 182.

Figure 3:
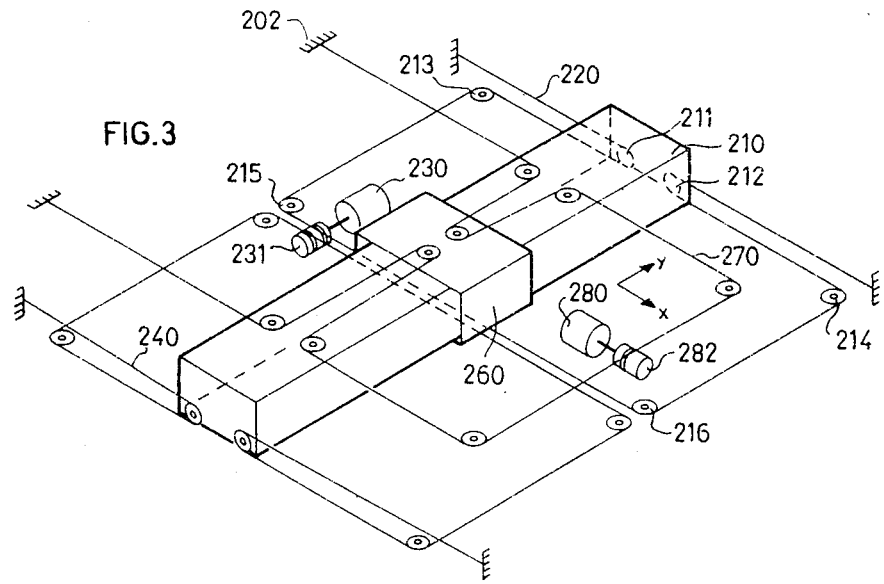

The arrangement illustrated in FIG. 3 is similar to that of FIG. 2, in that it also includes a single X-axis motor 230 driving two X-axis flexible coupling elements 220 and 240 of the X-axis carriage 210, except that in the FIG. 3 arrangement, all the flexible coupling elements are cables, and the coupling of the X-axis drive motor is somewhat different than in FIG. 2. Thus, in FIG. 3 the two X-axis coupling elements 220, 240 are cables, rather than belts because they change planes. Thus, the end portion of the cables trained over the two end-face pulleys (e.g., 211, 212) are in the same plane (perpendicular to the X-Y plane) as in FIGS. 1 and 2; but the intermediate portions of the cables are trained over the two pulleys 213 and 214 carried by the frame 202 and are disposed in the X-Y plane, i.e., perpendicular to the plane of pulleys 211 and 212. In addition, two further pulleys 215 and 216 are provided on the frame 202, also in the same plane as pulleys 213 and 214, for engaging the intermediate portion of the X-axis cable 220. The other X-axis cable 240 is similarly disposed at the opposite side of the X-axis carriage 210.

Both of the X-axis cables 220, 240 are driven by a single X-axis motor 230 via a drum 231 engaging the intermediate portions of the cables.

The Y-axis carriage 260 is driven by means of a single Y-axis cable 270 which in turn is driven by a Y-axis motor 280 via a drum 282 engaging the Y-axis cable 270.

Figure 4:
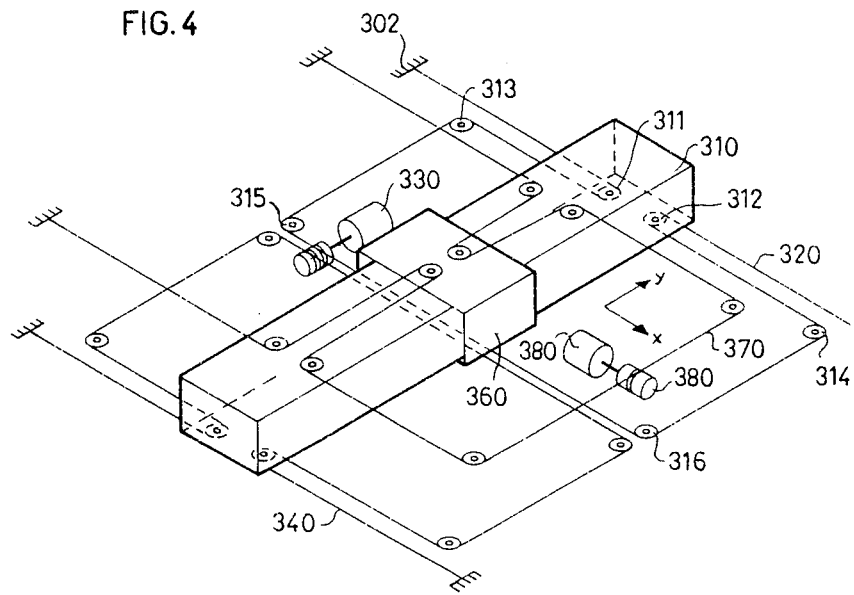

The arrangement illustrated in FIG. 4 is very similar to that of FIG. 3 except that the two X-axis flexible coupling elements 320, 340 are disposed so as to occupy a single plane, namely the X-Y plane, and therefore, although shown as cables, they could also be belts. In this case, the two pulleys 311, 312 carried by the X-axis carriage 310 are mounted on the underface of the carriage so as to be disposed in the X-Y plane, which is the same plane as occupied by the four pulleys 313, 314, 315 and 316 carried by the frame 302.

The Y-axis carriage 360 in the FIG. 4 arrangement is driven in exactly the same manner as in FIG. 3, namely by the Y-axis motor 380 driving drum 382 coupled to the single Y-axis cable or belt 370.

It will be seen that in all the above-described embodiments, two X-axis belts (or cables, viz FIG. 3) are used for driving the X-axis carriage, thereby enabling each such belts (or cables) to be relatively short. As described above, this maintains the dimensions of the belt under stress and varying temperature conditions and increases the load capable of being moved. In addition, in all of the disclosed embodiments, except that of FIG. 3, the X-axis cables or belts occupy a single plane, thereby permitting the use of belts, which provide even greater dimensional stability and strength than cables. Further, in all the disclosed arrangements the transmission ratio between the X-axis carriage and its drive motor (or motors) is the same as between the Y-axis carriage and its drive motor, thereby obviating the need for different transmission-ratio-changing mechanism for the two axes.

While the invention has been described with respect to four preferred embodiments, it will be appreciated that many variations, modifications and other applications of the invention may be made. For example, instead of motors driving the belts (or cables), there could be used encoders which read-out the position of the carriages when driven manually or otherwise. Many other variations, modifications and applications of the invention will be apparent.

What is claimed is:

1. A carriage positioning system for positioning a first carriage movable along a first axis with respect to a frame, and a second carriage carried by and movable with respect to said first carriage along a second axis perpendicular to said first axis; characterized in that said positioning system includes two flexible coupling elements each for coupling one of the opposite ends of said first carriage for movement with respect to the frame; each of said two flexible coupling elements having its opposite ends fixed to the frame on the opposite sides of the respective end of said first carriage and being trained over a pulley carried by said first carriage on each of the two opposite sides of the carriage, and over a further pulley carried by the frame on each of the two opposite sides of said first carriage; each of said two flexible coupling elements being coupled to a first member for driving same or for being driven thereby; said second carriage including a single flexible coupling element fixed at its two ends to said frame at one side of said two carriages; said single flexible coupling element being trained over two pulleys carried by each of said first carriage, a further pulley carried by each end of said second carriage between the associated last mentioned two pulleys, and a still further pulley carried by said frame at the side thereof opposite to that to which the two ends of the single flexible coupling element are fixed; said single flexible coupling element being coupled to a second member for driving same or for being driven thereby.

2. The system according to claim 1, wherein said flexible coupling elements of the first carriage and the second carriage are coupled to shaft encoders for reading-out the positions of said carriages.

3. The system according to claim 1, wherein the pulleys carried by said first carriage are carried at the opposite ends thereof in parallel planes perpendicular to that of the two axes.

4. The system according to claim 3, wherein the complete length of the two flexible coupling elements coupled to said first carriage at each end thereof, and all said pulleys for the associated last-mentioned two flexible coupling elements, are in a common plane.

5. The system according to claim 4, wherein said two flexible coupling elements for said first carriage are flat belts.

6. The system according to claim 1, wherein said flexible coupling elements of said first carriage are coupled to a first-axis motor which drives same, and said single flexible coupling element of said second carriage is coupled to a second-axis motor which drives same.

7. The system according to claim 6, wherein there are two first-axis motors, one coupled to each of the flexible coupling elements of said first carriage, said two first-axis motors being synchronously driven.

8. The system according to claim 6, wherein there is a single first-axis motor coupled by a shaft to both of the flexible coupling elements of said first carriage.

9. The system according to claim 6, wherein the end portions of each of the two flexible coupling elements coupled to the first-axes motor are each in a single plane perpendicular to the plane of the two axes, and the intermediate portion of the two flexible coupling elements coupled to the first-axis motor are in a plane parallel to that of the two axes.

10. The system according to claim 1, wherein the two pulleys carried at each end of said first carriage and the associated pulleys carried by the frame are all disposed in a common plane parallel to the plane of the two axes.

11. The system according to claim 10, wherein said two flexible coupling elements for said first carriage are flat belts.

* * * * *